United States Patent [19]

Hujer et al.

[11] 4,039,258
[45] Aug. 2, 1977

[54] METHOD AND APPARATUS FOR MAKING REPRODUCTIONS OF PHOTOGRAHIC COPY NEGATIVES OR THE LIKE

[75] Inventors: Friedrich Hujer, Grunwald; Wolfgang Zahn, Munich, both of Germany

[73] Assignee: AGFA-Gevaert, A.G., Leverkusen, Germany

[21] Appl. No.: 669,500

[22] Filed: Mar. 23, 1976

[30] Foreign Application Priority Data

Mar. 27, 1975   Germany .............................. 2513873

[51] Int. Cl.$^2$ ...................... G03B 27/78; G03B 27/32
[52] U.S. Cl. ........................................ 355/27; 355/38; 355/77
[58] Field of Search ................................ 355/27–29, 355/32, 77, 46, 38

[56] References Cited

U.S. PATENT DOCUMENTS

| | | | |
|---|---|---|---|
| 3,136,596 | 6/1964 | Overly | 355/29 X |
| 3,454,336 | 7/1969 | Wick et al. | 355/29 |
| 3,516,741 | 6/1970 | Thaddey | 355/38 X |
| 3,718,807 | 2/1973 | Bracken et al. | 355/29 X |
| 3,768,903 | 10/1973 | Steinberger et al. | 355/38 |
| 3,768,905 | 10/1973 | Williams | 355/77 |
| 3,875,861 | 4/1975 | Stackig | 355/28 X |
| 3,947,109 | 3/1976 | Kinder et al. | 355/29 |
| 3,947,110 | 3/1976 | Yamada | 355/38 |

*Primary Examiner*—Richard A. Wintercorn
*Attorney, Agent, or Firm*—Peter K. Kontler; John Kurucz

[57] ABSTRACT

Prints of film frames forming part of relatively short film strips are made by attaching to each film strip a tab, inserting the strip and the tab into an envelope which bears information denoting the order number, the number of prints to be made, the type of prints, and customer identification, shipping or delivering the envelopes to a processing laboratory where the information which is borne by the envelopes is encoded on the respective tabs, grouping the envelopes and film strips according to the nature of prints to be made and the type of film strips, reproducing successive or selected film frames of a group of strips by imaging them onto a web of photographic paper in a copying machine without splicing the film strips together, subdividing the web into discrete prints, assembling the prints with the associated envelopes and film strips for delivery or shipment to customers, and calculating and recording the cost of each order.

26 Claims, 7 Drawing Figures

METHOD AND APPARATUS FOR MAKING REPRODUCTIONS OF PHOTOGRAHIC COPY NEGATIVES OR THE LIKE

BACKGROUND OF THE INVENTION

The present invention relates to a method and apparatus for making reproductions or prints of relatively short film strips each of which includes at least one film frame (normally a short series of aligned film frames). More particularly, the invention relates to a method and apparatus for making reproductions or prints of film frames forming part of film strips which are provided with or connected to planar tabs or analogous carriers of encoded information. The term "encoded" is intended to denote such information which can be decoded or read by an automatic reader. Still more particularly, the invention relates to a method and apparatus for making reproductions of frames forming part of negative film strips which are delivered or sent to a processing laboratory in envelopes bearing information pertaining to the nature (type and size) of reproductions to be made, the number of reproductions to be made from one or more frames on a film strip, the identification of customers and or agencies to whom the reproductions (together with the respective film strips and envelopes) are to be returned or handed over, and the order numbers.

It was already proposed to provide relatively short negative film strips (e.g., strips having a row of four, five or six film frames) with planar tabs or analogous carriers of information. If a customer desires to obtain additional prints of one or more frames on a given film strip, the pertinent information (including the number and nature of prints to be made) is written onto the respective tab, and the film strip or strips are delivered or mailed to a collecting agency (e.g., a dealer in photographic equipment and/or material) or directly to a processing laboratory. The film strips which reach the laboratory are spliced together or otherwise connected to each other (e.g., by using adhesive tape or by welding) to form a long web which is thereupon caused to pass through a roll copying machine. The making of prints from successive frames of the web in the copying machine is automated to a certain degree or is fully automatic. In either event, the feeding of information into the copying machine presents a number of problems and contributes significantly to the cost of reproductions. The information (which is stored on the tabs) must be read and fed into the copying machine in a form which enables the machine to make a requisite number of reproductions as well as to make reproductions of required nature from successive frames of the aforediscussed web. Moreover, once it has passed through the copying machine, the web must be subdivided into discrete film strips which are returned to the dealers or directly to the customers, together with the respective prints. The subdivision of the web (as well as the assembly of the web from a series of film strips) must be carried out with utmost care since a customer is likely to send in a repeat order for the making of prints from those frames which were previously assembled into a web.

SUMMARY OF THE INVENTION

An object of the invention is to provide a novel and improved method of making prints from film frames which form part of relatively short film strips in such a way that the strips need not be assembled into an elongated web.

Another object of the invention is to provide a method of making prints or analogous reproductions which can be practiced by resorting to apparatus wherein the number of operations to be performed by hand is small, with attendant savings in time and labor and resulting lower cost of the prints.

A further object of the invention is to provide a method in accordance with which the application of information to planar tabs or other types of information carriers takes up less time than in accordance with heretofore known methods.

An additional object of the invention is to provide a novel and improved apparatus for the practice of the above outlined method.

Still another object of the invention is to provide an apparatus which can be used to make reproductions of entire film frames or of selected portions or film frames forming part of relatively short negative film strips.

Another object of the invention is to provide the apparatus with novel and improved means for applying information to tabs or analogous carriers of information while the tabs are attached to the respective film strips, and with novel and improved means for assembling prints with corresponding film strips and envelopes.

Still another object of the invention is to provide an apparatus which can automatically charge the customer or dealer for making of prints, not only by applying an invoice to the completed order but also by charging the account of the respective dealer or customer.

One feature of the invention resides in the provision of a method of making reproductions (e.g., prints on photographic paper) of relatively short film strips each of which includes at least one film frame and a carrier connected with the frame and adapted to store encoded information and which strips are (or are to be) confined in envelopes bearing information denoting the type, size and number of reproductions to be made, the order number and customer identification. The method comprises the steps of encoding on each carrier information including identification of the film frame or frames, the number of reproductions to be made and the nature (type and/or size) or reproductions to be made, encoding on each carrier at least some information which is borne by the respective envelope including information identifying the customer and/or the order number, grouping or sorting the film strips and the associated envelopes in accordance with the type of film strips and/or the nature of reproductions to be made, making reproductions of frames on each of the thus obtained groups of film strips independently of the other group or groups including imaging the frames of film strips of the respective group onto a web of photosensitive material (e.g., photographic paper), developing the photosensitive material, subdividing the web into discrete prints and introducing the thus obtained prints and the respective film strips into the corresponding envelopes. The method preferably further comprises the steps of counting the prints prior to introduction into the corresponding envelopes to thus determine the cost of reproductions, and charging the cost to the account of the respective customer.

The last mentioned step preferably includes identifying the customer by decoding relevant information on the respective carrier.

The second step preferably includes automatically decoding the information on the envelopes and applying the thus decoded information to the respective carriers.

The method may further comprise the steps of imprinting the cost of reproduction of film frames belonging into discrete envelopes onto discrete labels, and utilizing such labels to close the respective envelopes subsequent to the step of introducing the prints and the respective film strips into corresponding envelopes.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
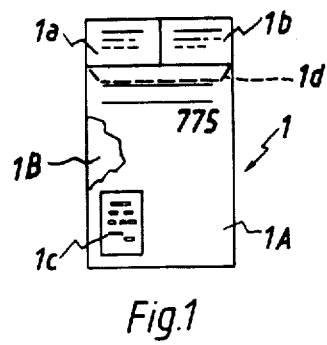
FIG. 1 is a plan view of an envelope for reception of short film strips or analogous copy negatives.

Referring first to FIG. 1, there is shown a flat rectangular envelope or container 1 which is dimensioned in such a way that it can readily store one or more film strips or copy negatives each of which contains a row of several (for example, four, five or six) film frames. If the envelope 1 is to receive two or more film strips, the strips are preferably stacked prior to insertion into the envelope. The outer side of the front panel 1A of the envelope 1 includes a space (within a rectangular box 1c) which contains encoded information, i.e., information of the type which can be decoded by an automatic reader. The box 1c is remote from the open end of the envelope 1. The encoded information in the box 1c includes data relating to the collecting agency, such as a dealer in photographic material and equipment who receives orders from customers and sends or delivers envelopes with film strips therein to a processing laboratory. The data in the box 1c further include an order number and, if desired, other types of information.

The envelope 1 comprises two detachable portions 1a and 1b. The portion 1a constitutes a customer's stub which is detached by the dealer and is handed to the customer as a receipt. The detachable portion 1b constitutes a second stub which is detached and retained by the dealer prior to mailing or shipping of the envelope 1 to the processing laboratory. The stubs 1a and 1b are adjacent to the open end of the envelope 1 and are connected to each other as well as to the front panel 1A by weakened portions, for example, by material between neighboring perforations of two rows of perforations. The rear panel 1B of the envelope 1 has a flat 1d which can be folded over the open end of the envelope, subsequent to detachment of stubs 1a, and 1b, and affixed to the front panel 1A to thereby seal the envelope and to confine one or more film strips therein.

Each of the stubs 1a and 1b contains information (written in longhand or by an office machine) which can be read by the customer and/or dealer. Such information includes the aforementioned order number, and the stub 1a can further include information indicating the date of delivery of the film strip or strips to the dealer. The order number (e.g., 775) is further applied to the outer side of the front panel 1A. When the envelope 1 is ready to be delivered or mailed to a processing laboratory, the stubs 1a and 1b are detached, the space between the panels 1A and 1B contains one or more film strips, and the flap 1d is attached to the upper marginal portion of the front panel 1A. The customer presents his stub 1a to the dealer on or after the agreed-upon date of completion of the order, and the dealer retains his stub 1b for presentation to the laboratory and/or as a means for facilitating the tracing of lost or misplaced envelopes 1.

Figure 2:
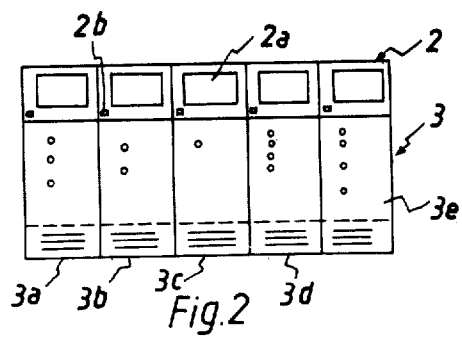
FIG. 2 is an elevational view of a film strip and of a data carrier or tab which is connected to one edge of the film strip.

FIG. 2 shows a relatively short copy negative or film strip 2 which includes a row of five film frames 2a. The film strip 2 is formed with five aligned holes or perforations 2b, one for each film frame 2a. Such perforations facilitate proper positioning of selected or successive film frames 2a in a copying machine, such as the machine shown in FIG. 4. One longitudinally extending marginal portion of the film strip 2 is connected to a planar data carrier or tab 3 which comprises five sections or fields 3a, 3b, 3c, 3d, 3e, one for each film frame 2a. If desired, the tab 3 can consist of five discrete sections or fields; however, it is normally preferred to utilize a one-piece tab because its attachment to the respective marginal portion of the film strip 2 is simpler than the attachment of several discrete tab sections or fields. The tab 3 can be attached to the film strip 2 by welding, by resorting to a suitable adhesive or by utilizing an adhesive-coated tape. The selection of means for securing the tab 3 to the film strip 2 depends on the nature of material of the tab and/or film strip. It is presently preferred to utilize a tab which consists of opaque paper and is sufficiently flexible so that it does not interfere with manipulation of the respective film strip 2.

The tab 3 is preferably attached to the film strip 2 by the dealer or film collecting agency, and each of the five fields 3a–3e of the tab should be large enough to enable the dealer and/or the laboratory to apply thereto all information which is needed for proper processing and identification of the respective film strip. The information which is to be applied to the fields 3a–3e includes the size and type of prints as well as the desired number of prints to be made of the respective film frames 2a.

Certain photographic processing laboratories are already equipped with apparatus which attach data carriers or tabs to film strips which are returned to customers. This facilitates the task of the dealer or collection agency because the film strips which are delivered or mailed by the customers are already attached to tabs of the type shown at 3 in FIG. 2. Furthermore, and if the processing laboratory furnishes film strips with tabs already attached thereto, the customer can fill in the necessary information on each of the fields 3a-3e prior to delivering the film strip or strips to the dealer. This enables the customer to fill in the information on each of the fields 3a-3e at home after a careful examination of the corresponding film frames 2a and after an equally carefully reached decision regarding the number of prints to be ordered as well as the type and size of each print.

If the tab 3 is to be attached by the dealer or by the customer in a dealer's shop, the filling-in of necessary information on each of the fields 3a-3e must take place in the dealer's office or store.

If a dealer's shop is not equipped with means to attach tabs 3 to film strips 2 which are furnished by customers, for example, if the dealer does not own apparatus which can automatically attach tabs or the dealer does not have a supply of tabs in his shop, the order must be delivered or sent to a processing laboratory in the customary way, i.e., with information furnished on one or more sheets which accompany the film strips. The tabs are then attached to the respective film strips at the processing laboratory, and an employee fills in the information on each of the fields 3a-3e. This last-mentioned mode of applying tabs is the least desirable. Therefore, it is advisable to furnish suitable equipment to each dealer or to each of the larger dealers so that attachment of tabs can take place in the dealer's shop, provided that the tabs are not attached to the film strips which are being returned from the laboratory to the customer, either directly or through the intermediary of a dealer.

Figure 3:
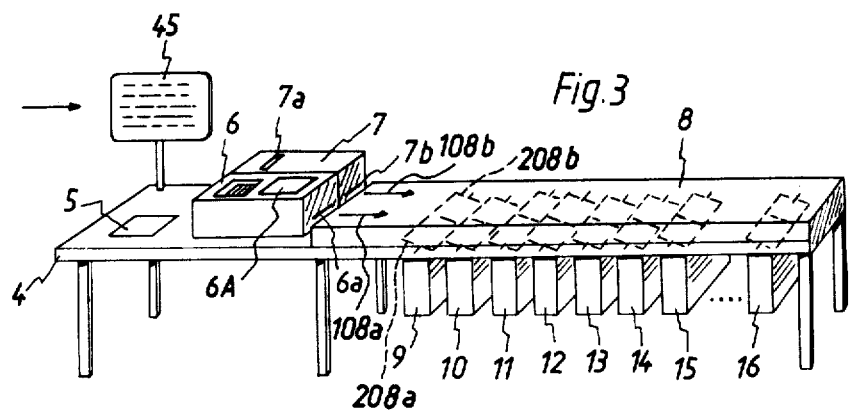
FIG. 3 is a perspective view of an arrangement for applying information to tabs and for sorting or grouping the envelopes and film strips according to the size of reproductions to be made and the type of film strips.

The manner in which envelopes 1, with one or more film strips 2 and tabs 3 confined therein, are initially manipulated in a laboratory is illustrated in FIG. 3. The arrangement shown in FIG. 3 comprises a relatively large table or support 4 the left-hand portion of which includes a transparent or translucent viewing pane 5 which is illuminated from below in a manner not shown in the drawing. The pane 5 is adjacent to a data applicator 6 and a reader 7. The screen of a suitable readout device 45 is mounted on the table 4 behind the viewing pane 5.

The right-hand portion of the table 4 supports a sorting or group forming unit 8 including a series of discrete pairs of receptacles 9, 10, 11, 12, 13, 14, 15 and 16. The grouping unit 8 further comprises conveyors (indicated by arrows 108a and 108b) which respectively transport film strips 2 (with tabs 3 attached thereto) and envelopes 1 along separate paths and into selected receptacles. Still further, the grouping unit 8 includes suitable deflecting devices 208a and 208b which are actuated simultaneously (i.e., a deflecting device 208a for film strips 2 is actuated simultaneously with the associated deflecting device 208b for envelopes 1) to direct successive film strips or groups of film strips and the corresponding envelopes 1 into one and the same receptacle or into discrete compartments of one and the same receptacle, namely a receptacle which is intended to store a group of film strips from which a certain type of print is to be made. The exact construction of the conveyors 108a, 108b and deflecting devices 208a, 208b forms no part of our invention. Such devices are known in the art of photographic processing laboratories. Each of the receptacles 9, 10, 11, 12, 13, 14, 15 and 16 may consist and preferably does consist of a pair of discrete receptacles (see 24 and 37 in FIG. 7), one for strips 2 and the other for envelopes 1.

The operation of the arrangement which is shown in FIG. 3 is as follows:

An attendant standing or sitting in front of the table 4 adjacent to the viewing pane 5 opens an envelope 1 which has been delivered or mailed by a customer or dealer and removes the film strip(s) therefrom. The thus emptied envelope 1 is inserted into an inlet or slot 7a of the reader 7. If the envelope 1 is preperly inserted into the reader 7, the corresponding box 1c is in a requisite position so that the information thereon can be read by automatic reading mechanism and observed on the screen of the read-out device 45. It is assumed that the envelope 1 contained a single film strip 2 with a tab 3 properly filled in and attached to one longitudinally extending marginal portion of the film strip, namely to that marginal portion which is adjacent to the holes 2b. The strip 2 is placed onto the pane 5 so that the attendant can observe individual frames 2a in order to estimate the quality of the prints to be made and to identify those film frames 2a which are not suitable for the making of acceptable reproductions.

The table 4 and/or the applicator 6 includes a keyboard (shown at 6A) which enables the attendant to record in the applicator 6 the serial numbers of successive film frames 2a, the number of prints to be made therefrom and the size and type (nature) of prints. The applicator 6 includes a customary information storing device (not specifically shown) which stores such information until the respective film strip 2 (with the tab 3 attached thereto) is introduced into the applicator by way of an inlet or slot, not shown, whereby the information is automatically transferred onto (e.g., embossed into) the tab 3. Prior to transfer of information onto the tab 3, such information is observable on the screen of the readout device 45 so that the attendant can inspect the information and correct eventual typographical errors. The information which is temporarily stored in the data applicator 6 further includes the number of film strips 2 which belong to a given customer (i.e., the number of strips removed from the envelope 1 which has been inserted into the reader 7) as well as all other information in the box 1c of the corresponding envelope 1, i.e., the identification of customer and dealer. Such information can be typed in by the attendant or it may be automatically transferred into the storing unit of the data applicator 6 in response to proper insertion of envelope 1 into the reader 7. The information which is gained in response to insertion of envelope 1 into the slot 7a can be transferred onto the tab 3 (upon introduction of the respective film strip 2 into the data applicator 6) in the form of suitably configurated holes or perforations.

When the transfer of data onto a tab 3 in the data applicator 6 is completed, the conveyors 108a, 108b are started (preferably automatically) to remove the envelope 1 and the corresponding film strip or strips 2 (with tab or tabs 3) from the devices 6, 7 by way of outlets or slots 6a, 7b. The deflecting devices 208a, 208b are adjusted in automatic response to transfer of information onto a tab 3 in the data applicator 6 so that the film strip 2 and the associated envelope 1 invariably enter the appropriate receptacle, e.g., the receptacle 15 which is selected to store a group of film strips 2 whose frame 2a are to be used for the making of prints having a predetermined size. The deflecting or directing devices 208a, 208b can be adjusted in automatic response to depression of corresponding keys on the board 6A of the data applicator 6 to insure that each and every film strip 2 (and the associated envelope) invariably enters the corresponding receptacle. If an envelope 1 contains more than one strip 2, the corresponding switching device 208a remains in a selected position until the last strip of a series of two or more strips has entered the appropriate receptacle (e.g., 15).

The receptacles 9–16 are intended to receive groups of film strips 2 whose frames 2a are to be used for the making of given types and sizes of prints as well as to receive identical types of film strips, e.g., strips of 35-millimeter film.

Figure 4:
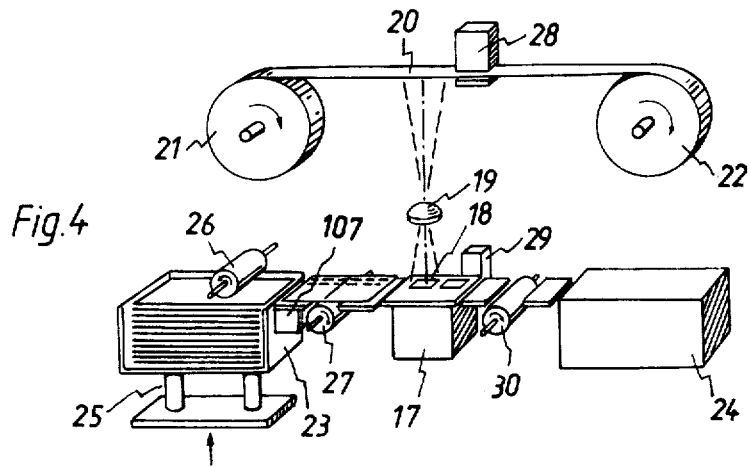
FIG. 4 is a fragmentary perspective view of a copying machine which can receive groups of film strips from the arrangement of FIG. 3.

A receptacle (e.g., 15) which has accumulated a group including a given number of film strips 2 and envelopes 1 is thereupon transferred into a copying machine, e.g., a machine of the type shown in FIG. 4. It is replaced by an empty receptacle 15 so that the arrangement of FIG. 3 can proceed with sorting or grouping of film strips and envelopes. Alternatively, a group of strips 2 in a filled receptacle can be manually or automatically transferred into a depository or tray 23 of the copying machine shown in FIG. 4. This machine comprises a light source 17 which is surrounded by a suitable light duct, a platform or copyboard 18 on which a film strip 2 rests during the making of prints from successive or selected frames 2a, and imaging lens system 19, and a mechanism for transporting a web 20 of photosensitive record carrier material (e.g., photographic paper) in stepwise fashion so that the lens system 19 exposes successive portions of the web 20. The just mentioned mechanism includes a supply reel 21 which stores convoluted unexposed photographic paper, a takeup reel 22 which collects exposed photographic paper, and means for driving the reel 21 and/or 22 in stepwise fashion.

The tray 23 forms part of or includes an adapter (e.g., a lifting mechanism) 25 which raises the stack of film strips 2 therein at regular intervals or continuously so that the uppermost film strip 2 is maintained in the range of and can be properly engaged and moved by an advancing roller 26 which causes the uppermost strip to travel in a direction toward the platform 18 above the light source 17. If desired or necessary, the copying machine may include one or more auxiliary film advancing rollers 27 which can be mounted in the space between the tray 23 and the platform 18. Successive film strips 2 which have been advanced beyond the platform 18 (by one or more rollers 30) are caused to accumulate in a second depository or tray 24. The configuration and/or dimensions of each of the trays 23, 24 may be identical with those of the receptacles 9–16 so that an empty tray 23 or 24 can be used in the grouping unit 8 of FIG. 3 and that a filled or empty receptacle of FIG. 3 can be used in the copying machine of FIG. 4.

During transport of a film strip 2a from the tray 23 onto the platform 18, the information on the associated tab 3 is decoded by an automatic reader 107 which transmits information to the exposure or imaging means (including the light source 17 and lens 19) of the copying machine so that the latter is properly adjusted to make the required number of reproductions or prints by regulating the intensity of light, the exposure time and/or other factors for the purpose of producing optimum reproductions. The reader 107 controls the copying cycle.

A scanner 29 monitors the film strip 2 on the platform 18 and arrests the strip in a single position or a series of positions in each of which the respective frame 2a is in exact register with the light source 17 and lens system 19. The scanner 29 can monitor the holes 2b shown in FIG. 2 and/or other indicia which are applied to the strip 2 in such position that they can be used as reference marks for proper positioning of frames 2a with respect to the light source 17 and lens system 19.

FIG. 4 further shows an information encoding device 28 which is adjacent to the path of movement of the web 20 and serves to apply to the web information including marks (e.g., holes in the form of slits) which indicate where the web is to be subdivided or severed to yield discrete reproductions or prints, and marks which identify the last print belonging to a given order. Such information can be applied to the rear side of the web 20, i.e., to that side which is not coated with a photosensitive emulsion.

The operation of the encoding device 28 is preferably controlled by signals which are furnished by the scanner 29, either directly or by way of a signal comparing circuit, not shown. Such signal comparing circuit can decipher or decode the order numbers on successive tabs 3 and causes the device 28 to apply an indicium denoting the last print of an order in response to completion of last exposure of the last or rearmost frame 2a on a given film strip 2. For example, the signal comparing circuit can cause the encoding device 28 to apply a symbol denoting the last print of an order when the scanner 29 has detected a new order number, i.e., an order number deviating from the preceding order number and indicating that the film strip 2 on the platform 18 belongs to a different customer. The encoding device 28 then begins to apply the new order number to successive prints which are being exposed onto the web 20.

The application of data to tabs 3 during processing in the arrangement of FIG. 3 can take place in such a way that all information (or certain types of information) will be available at the leading end of a tab 3 which reaches the reader 107 of FIG. 4. Such information may include data identifying that frame 2a or those frames (e.g., two frames) of the film strip 2 which are to be used for the making of one or more prints. The reader 107 then transmits appropriate signals which are used to control the operation of the copying machine, i.e., to maintain one, two or all frames 2a in register with the light source 17 for intervals of time which are required for the making of a desired number of prints. It will be noted that the arrangement of FIG. 3 and the machine of FIG. 4 can be utilized for grouping and copying of film strips 2 wherein only one frame is to be used for the making of prints or wherein prints are to be made of two or more neighboring or spaced-apart film frames.

In accordance with a modification of the just described procedure, the aforediscussed information can be encoded on successive fields 3a–3e of each tab 3 or on those fields which are adjacent to frames 2a to be used for the making of prints during transport through the copying machine of FIG. 4. The reader 107 is then placed next to or immediately upstream of the platform 18 so that it can read information on that field of the tab which is associated with the frame 2a in register with the light source 17. The reader 107 decodes the information on the aligned field of the tab 3 and arrests the strip 2 when a film frame 2a of which one or more prints are to be made reaches the copying station. The exact register of such frame with the light source 17 and lens system 19 is insured by the scanner 29. The film strip 2 is set in motion when the machine of FIG. 4 has completed the making of a preselected number of prints from a given frame 2a, and the transport is continued until the reader 107 again transmits a signal indicating that the frame 2a approaching the copying station is to be used for the making of one or more prints on the intermittently advancing web 20.

Figure 5:
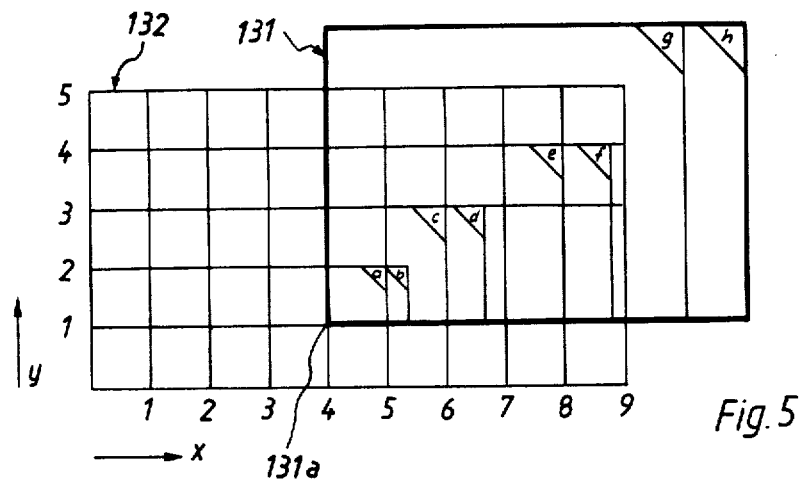
FIG. 5 is a plan view of two light-transmitting patterns which can be utilized to pinpoint and identify selected portions of prints or film frames which require reproduction.

Customers often order enlargements of selected portions of certain film frames. Such work is presently carried out by hand and, therefore, the making of enlargements of selected portions of film frames is quite expensive. FIG. 5 shows a pair of transparent or translucent templates or patterns 131, 132 which can be used by a customer to pinpoint a selected portion of a previously made print or a selected portion of a copy negative so that such selected portion can be enlarged in the laboratory. It is assumed that the previously made print is a rectangular print 9 centimeters long and 5 centimeters wide. The customer or the dealer is in possession of patterns 131, 132 the latter of which has a size identical with that of the previously made print and is formed with a network of rectangular coordinates $x$ and $y$, one centimeter apart. The pattern 131 includes eight different areas $a, b, c, d, e, f, g$ and $h$ all of which have a common lower left-hand corner, as at 131a. Some of the areas $a$ to $h$ are square (see, for example, the area $a$), and the others are rectangular (see, for example, the area $d$). The transparent or translucent pattern 132 is placed over the previously made print and the pattern 131 is placed above the pattern 132 and is shifted until the portion to be enlarged is in register with one of the areas $a$ to $h$. Such one area (e.g., the area $c$) can be readily identified by giving its size ($c$) and the location of its lower left-hand corner (e.g., $x5, y1$). The size of the smallest area $a$ is $1 \times 1$ centimeter, and the size of the largest area $h$ is $5 \times 7$ centimeters.

Figure 6:
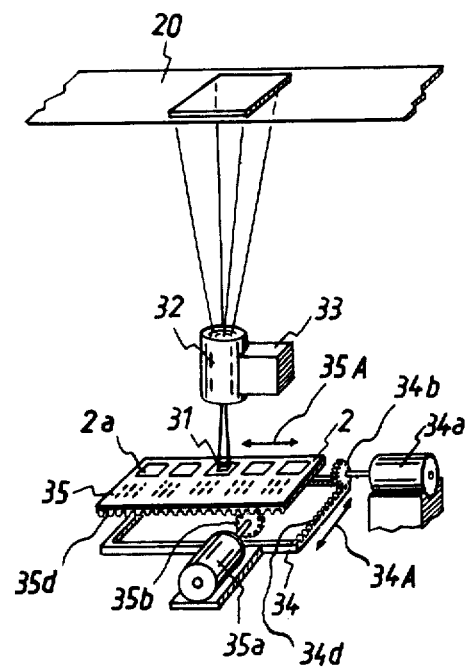
FIG. 6 is a fragmentary perspective view of a copying machine which can be used to make reproductions of selected portions of film frames.

It will be noted that the furnishing of three bits of information ($c, x4, y1$) in a given sequence or at random suffices to properly identify the location as well as the size of the portion to be enlarged. Such information is encoded in or written onto the corresponding field of the tab 3. The enlargements can be made in a slightly modified copying machine a portion of which is illustrated in FIG. 6. The fixed lens system 19 of FIG. 4 is replaced with a lens system 32 of variable focal length which can be adjusted by a suitable motor 33. The latter is controlled by the reader 107 (not shown in FIG. 6) so that it enables the copying machine of FIG. 6 to enlarge selected portions of certain film frames 2a. The size of each print on the web 20 is preferably the same, irrespective of whether such print is the image of the entire frame 2a or of a selected portion of such frame. Thus, the lens system 32 will be adjusted so that it can make a print of an entire frame 2a or of any one of the areas $a$ to $h$ indicated on the pattern 131 of FIG. 5.

The copying machine of FIG. 6 further comprises two cross slides 34, 35 which replace the platform or copyboard 18 of FIG. 4 or are movably mounted on such platform. The lower cross slide 34 carries the upper cross slide 35 and is movable in directions indicated by a double-headed arrow 34A through the medium of a reversible electric motor 34a. Thus, the motor 34a can move a film strip 2 on the upper cross slide 35 along the ordinate ($y$) of the pattern 132. A second reversible motor 35a which is mounted on the cross slide 34 can move the upper cross slide 35 (and the film strip 2 thereon) in directions indicated by a double-headed arrow 35A, i.e., in the direction of the abscissa ($x$) of the coordinate system on the pattern 132. The motors 34a, 35a drive suitable gears 34b, 35b in mesh with elongated racks 34d, 35d on the corresponding slides 34, 35. When the motors 33, 34a, 35a respectively adjust the lens system 32 and the cross slides 34, 35, the selected portion 31 of a frame 2a on the film strip 2 which rests on the cross slide 35 is in an optimum position for imaging onto the photosensitive layer of the web 20, and the position of the lens system 32 is such that the selected portion 31 of the frame 2a is enlarged in accordance with the information ($c$) encoded on the corresponding tab 3.

The copying machine of FIG. 6 also comprises suitable fixed diaphragms (not shown) one of which is moved into register with the selected portion 31 of a frame 2a prior to the making of an exposure. Several fixed diaphragms, one for each area $a$ to $h$ of the pattern 131, are normally preferred over an adjustable diaphragm. The diaphragms are located below the cross slide 35 so as to confine the light beam issuing from the light source (not shown) in accordance with the size of the selected portion 31 of a frame 2b which is in register with the lens system 32.

The patterns 131 and 132 of FIG. 5 can be mass-produced of inexpensive synthetic plastic material and can be shipped or handed to customers together with their orders. Alternatively, the patterns can be furnished to or purchased by the dealer and presented or sold to each customer who picks up an order. All that counts is to enable a customer to pinpoint and identify selected portions 31 of certain film frames 2a at his or her home or at the dealer's shop before a repeat order is sent to the processing laboratory. If the laboratory accepts orders directly from amateur or professional photographers, the patterns 131, 132 can be made available in the reception room of the laboratory so that a customer who picks up an order can take along one or more sets of patterns, or that a customer who brings an order in person can pinpoint selected portions of certain film frames before the order is accepted by the laboratory.

The making of prints in the machine of FIG. 4 or 6 is followed by development of the web 20, and the development is followed by an inspection and identification of unsatisfactory prints. Such quality control preferably includes application of encoded information onto the rear sides of unsatisfactory prints, e.g., by means of a device analogous to a crayon.

The film strips 2 (in the depository or tray 24), the corresponding portions of the exposed and developed web 20 (which may include one or more properly identified unsatisfactory prints) and the corresponding envelopes 1 must be assembled so that they can be returned to the corresponding dealers or directly to customers. Moreover, the processing laboratory must be equipped with means for billing or charging the customer or dealer and preferably also with means for attaching an invoice to each order before the order is returned to the dealer or customer. All such operations can be carried out in the portion of apparatus which is shown schematically in FIG. 7. This portion of apparatus is somewhat similar to that which is disclosed in German Offenlegungsschrift No. 2,048,552.

Figure 7:
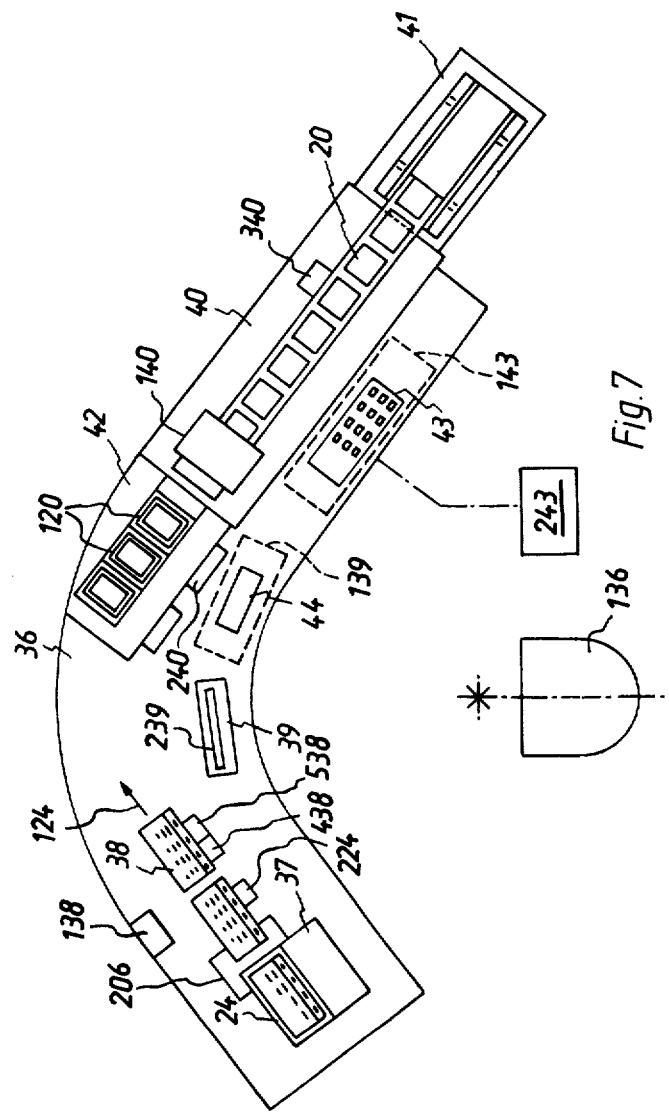
FIG. 7 is a schematic plan view of an arrangement for subdividing a web of photographic paper into discrete prints, for assembling the prints with the respective film frames and envelopes, and for calculating and recording the cost of each order.

FIG. 7 shows a substantially kidney-shaped table or support 36 with a seating facility 136 in the space between the two substantially straight sections of the table. A depository or tray 24 with a group of film strips 2 which have been caused to pass through the copying machine of FIG. 4 or 6 is placed onto the left-hand portion of the table 36, as viewed in FIG. 7, and a depository or tray 37 containing the corresponding envelopes 1 is placed next to the tray 24. The sequence in which the strips 2 are stacked in the tray 24 is the same as or inverse to the sequence of stacking envelopes 1 in the tray 37. A conveyor, indicated by arrow 124, transports successive film strips 2 (with tabs 3 attached thereto) into the range of a reader 206 and thereupon to an assembling unit 38 which occupies an assembling station and is or may be constructed in a manner disclosed in German Offenlegungsschrift No. 2,048,412. The reader 206 monitors the order numbers of successive film strips 2 and furnishes a signal in response to detection of a mark which is indicative of the last film strip belonging to a given customer. The conveyor 124 is then arrested so that the assembling unit 38 receives a single strip 2 at a time or two or more strips, all belonging to the same customer. The assembling unit 38 includes means, e.g., one or more photoelectric cells or one or more microswitches, which produce signals when the unit 38 is empty; such signals can be used to start the conveyor 124 which then begins to remove film strips 2 from the tray 24. Still further, the assembling unit 38 may include means for reading or deciphering the encoded order numbers on the film strips 2 therein and for comparing the decoded information with relevant information on the corresponding envelope 1 in order to detect eventual errors. The presence of an inappropriate envelope and/or one or more inappropriate film strips can be reported by one or more visible, audible and/or otherwise detectable signals furnished by a suitable warning device or alarm means 138.

The central portion of the table 36 is formed with an opening 39 into which the person occupying the seat 136 inserts an envelope 1 subsequent to removal of such envelope from the tray 37. The box 1c of a properly inserted envelope 1 is in register with a reader 239 which is mounted in or below the table 36 and decodes the order number as well as information pertaining to the dealer. The opening 39 is adjacent to the label-ejecting aperture 44 of a printing mechanism 139 which serves to imprint information relating to the cost of operation upon an adhesive-coated label, and such label is thereupon used to close and seal the envelope 1 after the latter has received the corresponding film strip(s) 2, tab(s) 3 and prints.

The right-hand portion of the table 36 supports a subdividing or severing device 40 which serves to subdivide an exposed and developed web 20 into discrete reproductions or prints 120. As mentioned above, the encoding device 28 of the copying machine applies to the web indicia or marks which are detected by the severing device 40 so that the latter cuts across the web 20 in the spaces between neighboring prints 120. Such indicia may be in the form of slits, notches, black dots or holes.

The setting of the severing device 40 is preferably such that, once started, it continues to sever the web 20 until it detects a mark which identifies the last print of an order. The severing device 40 is thereupon arrested. In order to insure that a relatively heavy exposed and developed web 20 (see the takeup reel 22 in FIG. 4) can be paid out at a predictable rate, the apparatus of FIG. 7 preferably further includes a web withdrawing mechanism 41 which is mounted on or adjacent the right-hand end portion of the table 36 and includes means for driving the roll of convoluted web 20 in a direction to advance the web toward the severing device 40. This reduces tensional stresses upon the web and insures that the severing device 40 can invariably cut across the web in the spaces between neighboring prints 120.

The severing device 40 is followed by a classifying unit 42 which preferably includes two tracks, one for satisfactory prints 120 and the other for unsatisfactory prints. As mentioned above, unsatisfactory prints are identified by marks which are applied to the rear sides thereof, and such marks are detected by the classifying unit 42 which automatically segregates satisfactory prints from unacceptable prints. For example, the classifying unit 42 may include several endless belt or band conveyors which can classify prints 120 according to quality at the rate at which the prints are furnished by the severing device 40. As a rule, the prints issue from the severing device 40 in rapid sequence. Unsatisfactory prints are segregated for the purpose of making new prints with different adjustment of exposure controls in the copying machine of FIG. 4 or 6. If desired, the quality control may include the step of and means for identifying those prints which can be improved as well as those prints which are totally unsatisfactory so that repeated copying of corresponding film frames 2a would serve no useful purpose.

The severing device 40 preferably includes or cooperates with a suitable counter 140 which counts the number or prints 120 belonging to a given order and transmits appropriate signals to a first computer 143. Another counter 240 is preferably provided in or associated with the classifying unit 42 to determine the total number of satisfactory, unsatisfactory and totally useless prints. Such information is also transmitted to the computer 143. The classifying unit 42 can receive prints in the order corresponding to that of copying the frames 2a in the machine of FIG. 4 or 6, or in an inverse order.

The table 36 further supports a keyboard 43 which is sufficiently close to the seat 136 so that it can be operated by the attendant who occupies the seat. The keyboard 43 can be used by the attendant to transmit to the computer 143 additional information, such as the date of completion of the order, the code number of the person in charge (especially at the copying station), the size of prints, the type of film and the type of film development. All such information is transmitted to the computer 143 and/or to the printing mechanism 139. If the total number of prints 120 belonging to an order is not automatically transmitted to the computer 143, the occupant of the seat 136 reads the counter 140 which is associated with the severing device 40 and types in appropriate information by actuating the keys of the board 43. Moreover, the attendant can transmit information to correct the number of prints 120 to be charged to a customer if the scanning mechanism of the copying machine has overlooked the mark indicating the last print of an order so that the copying machine has turned out an excessive number of prints.

The operation of the structure of FIG. 7 is as follows:
The web withdrawing mechanism 41 contains a full roll of convoluted exposed and developed web 20, the tray 24 contains a stack of film strips 2, and the tray 37 contains a stack of envelopes 1. The cycle begins by starting the severing device 40 so that the latter subdivides the leader of the web 20 into discrete prints 120. Such operation of the severing device 40 continues until its scanner 340 detects a mark which denotes the last print 120 of the first order. At the same time, the conveyor 124 which is disposed upstream of the assembling unit 38 withdraws the corresponding film strip or strips 2 (with tab(s) 3 attached thereto) from the tray 24 and transports such strip or strips into the unit 38. The conveyor 124 is arrested when its scanner 224 detects a mark identifying the last film strip 2 of an order. The attendant who occupies the seat 136 removes the corresponding envelope 1 from the tray 37 and introduces it into the opening 39 so that the box 1c of such envelope registers with the reader 239 in or below the table 36. The reader 239 decodes the information in the box 1c and transmits appropriate signals to the printing mechanism 139 and/or to the computer 143. The attendant thereupon utilizes the keyboard 43 to transmit additional information to the printing mechanism 139 and/or computer 143. The computer 143 evaluates the information (including the number of prints 120, the cost of individual prints, the cost of development and others) and actuates the mechanism 139 which prints an invoice onto a label, and such label thereupon emerges from or is accessible in the aperture 44 for application to the corresponding envelope 1 (after the envelope has received the corresponding film strip(s) 2, tab(s) 3 and prints). The prints 120 to be placed into the envelope 1 which has been inserted into the opening 39 are available in the classifying unit 42, and the corresponding film strip or strips 2 are ready in the assembling unit 38. The attendant removes the envelope 1 from the opening 39 and inserts into such envelope the corresponding prints 120 (removed from 42) and the corresponding film strip or strips 2 (removed from 38) before the envelope is closed and sealed by the invoice-bearing label which is available in the aperture 44 or which has been ejected through this aperture by the printing mechanism 139.

The computer 143 further transmits information to a central computer 243 which charges the account of the dealer or customer, as the case may be. The central computer 243 stores such information, and the information is available for the making of weekly, biweekly or monthly statements which are forwarded to the respective dealer or customer. The statement which is sent or delivered to or picked up by the dealer or customer preferably identifies each order so that the customer can determine the cost of each individual order or that the dealer can bill his customers accordingly. The closed and sealed envelopes 1 are placed into a collecting receptacle (not shown) for delivery or mailing to the dealers and/or customers.

The aforedescribed method can be practiced for the making of prints 120 having identical dimensions and from identically dimensioned film frames. If the frame sizes and/or the prints to be made are different, the prints must be made in discrete series, i.e., a discrete series for each size of prints and a discrete series for each size of film frames.

The number of discrete units and devices in the structure of FIG. 7 can be reduced, or their construction simplified, if the envelopes 1 and/or film strips 2 (i.e., their tabs 3) are provided with information indicating the number of film strips which belong to a given customer. The assembling unit 38 then comprises or is associated with a counter 438 for individual film strips which transmits information to a suitable comparing device 538 serving to compare such number with information appearing on the tab 3 and/or envelope 1. If the number of strips in the unit 38 deviates from the number which is encoded onto a tab 3 and/or corresponding envelope, or does not coincide with detection of the mark which denotes the last print of an order, the comparing device 538 furnishes a warning signal which alerts the attendant that the automatic classification and/or assembly requires adjustment.

An important advantage of the improved method and apparatus is that the film strips 2 need not be spliced together to form a relatively long web or strip. This renders it possible to sort or group the film strips according to their size and/or type as well as according to the nature of reproductions 120 to be made from their frames 2a. Furthermore, the assembly of film strips 2 with the respective prints 120 and envelopes 1 is simpler and less expensive because it need not be preceded by a complex and time-consuming subdivision of an elongated web into discrete film strips. Therefore, each film strip can be shipped or delivered to a processing laboratory as often as desired.

Another important advantage of the improved method and apparatus is that, by appropriate selection of the copying machine, one can make reproductions of entire film frames 2a or of predetermined portions (31) of film frames.

Unless otherwise stated, the term "customer" (as used in the appended claims) is intended to denote an amateur or professional photographer who delivers or mails repeat orders directly to a processing laboratory or an agency (e.g., a dealer in photographic equipment or material, a drugstore, a department store, a pharmacy or a candy store) specializing in collection of orders from photographers and shipment or delivery of such orders to a processing laboratory.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

The German Offenlegungsschrift No. 2,048,552 corresponds to U.S. Pat. No. 3,857,220 which is incorporated by reference in the specification of the present application.

What is claimed is:

1. A method of making reproductions of frames on relatively short film strips each of which includes at least one frame and a carrier connected with the frame and adapted to store encoded information and which strips are to be confined in evelopes bearing information denoting the type, size and number of reproductions to be made, the order number and customer identification, comprising the steps of
   a. encoding on each carrier information including identification of the film frame and the number and nature of reproductions to be made;
   b. encoding on each carrier at least some information which is borne by the respective envelope, including information identifying the customer and/or the order number;
   c. grouping the film strips and the respective envelopes in accordance with the type of film strips and/or the nature of reproductions to be made;
   d. making reproductions of frames on each of the thus obtained groups of film strips independently of other group or groups, including imaging the frames of film strips in the respective group onto a web of photosensitive material;

e. developing the photosensitive material;

f. subdividing the web into discrete prints; and g. introducing the thus obtained prints and the corresponding film strips into the respective envelopes.

2. A method as defined in claim 1, further comprising the steps of h. counting the prints prior to introduction into the respective envelopes to thus determine the cost of the reproduction; and i. charging the cost to the account of the respective customer.

3. A method as defined in claim 2, wherein said step (i) includes identifying the customer by decoding relevant information on the respective carrier.

4. A method as defined in claim 2, further comprising the steps of imprinting the cost of reproduction of film frames belonging into discrete envelopes onto discrete labels, and utilizing such labels to close the respective envelopes subsequent to said step (g).

5. A method as defined in claim 1, wherein said step (b) comprises automatically decoding the information on said envelopes and applying the thus decoded information to the respective carriers.

6. In an apparatus for making reproductions of frames on relatively short film strips each of which includes at least one frame and a carrier connected with the frame and adapted to store encoded information and which strips are to be confined in envelopes bearing information denoting the type, size and number of reproductions to be made, the order number and customer identification, a combination comprising applicator means for encoding on each carrier information including identification of the film frame, the number and nature of reproductions to be made, the order number and customer identification; means for grouping the film strips and the respective envelopes according to the type of film strips and/or the nature of desired reproductions; copying means for making reproductions of frames on each of the thus obtained groups of film strips independently of other group or groups, including means for imaging the frames of film strips in the respective group onto a web of photosensitive material which is thereupon developed; and means for subdividing the web into discrete reproductions.

7. A combination as defined in claim 6, further comprising reader means for decoding information on the envelopes and for supplying such information to said applicator means.

8. A combination as defined in claim 6, wherein said grouping means comprises means for conveying the envelopes and the corresponding film strips along separate paths, a plurality of paired receptacles, one pair for each of said groups, and means for directing the strips and associated envelopes from the respective paths into the receptacles of selected pairs.

9. A combination as defined in claim 8, wherein said directing means comprises a discrete deflecting device for each of said receptacles.

10. A combination as defined in claim 6, wherein said copying means further includes a depository for a group of film strips, means for advancing film strips from said depository into the range of said imaging means and reader means for decoding information on the carriers of advancing film strips and for adjusting said imaging means in accordance with information which is decoded by said reader means.

11. A combination as defined in claim 10, wherein said copying means further comprises scanner means arranged to locate the frames of successive film strips in a predetermined position with respect to said imaging means.

12. A combination as defined in claim 10, further comprising adapter means arranged to maintain successive film strips of a group in said depository in the range of said advancing means.

13. A combination as defined in claim 6, wherein said applicator means includes means for applying to selected film strips and/or carriers encoded information denoting the last strip of an order, said copying means further comprising means for decoding such information and for identifying the corresponding portions of said web.

14. A combination as defined in claim 6, further comprising means for at least partially assembling the reproductions with the corresponding envelopes and/or film strips.

15. A combination as defined in claim 14, wherein said copying means further comprises means for applying to said web marks, one for each of said reproductions, said subdividing means having means for detecting said marks and for severing the web in response to detection of successive marks.

16. A combination as defined in claim 14, wherein said applicator means includes means for applying to selected film strips and/or carriers encoded information denoting the last frame of an order and said copying means further includes means for decoding such information and for applying to said web marks denoting the last reproductions of successive orders, and further comprising means for deactivating said subdividing means in response to detection of such marks on said web.

17. A combination as defined in claim 16, further comprising a depository for a group of film strips which have passed through said copying means, said assembling means comprising means for conveying successive film strips from said depository to an assembly station and first means for decoding information on the carriers of film strips which are conveyed to said station, and further comprising second means for decoding information on the corresponding envelopes.

18. A combination as defined in claim 17, wherein said second decoding means has an opening for insertion of successive envelopes.

19. A combination as defined in claim 17, further comprising means for producing detectable signals when the information decoded by said first decoding means does not match the information which is decoded by said second decoding means.

20. A combination as defined in claim 17, wherein said first decoding means includes a reader and means for detecting information denoting the last frames of successive orders, and further comprising means for stopping said conveying means in response to detection of such information and means for producing signals in response to detection of different order numbers prior to stoppage of said conveying means.

21. A combination as defined in claim 16, wherein said subdividing means comprises means for counting the number of reproductions between successive deactivations of said subdividing means and said assembling means includes a reader arranged to decode information on successive carriers, and further comprising means for producing signals when the number of reproductions determined by said counting means between successive deactivations of said subdividing means deviates from the corresponding information decoded by said reader on the respective carrier.

22. A combination as defined in claim 6, further comprising means for computing the cost of successive orders and for recording the thus computed cost.

23. A combination as defined in claim 6, further comprising means for facilitating identification of selected portions of film frames for the purpose of making enlargements of such selected portions, said applicator means having means for encoding the thus obtained identifying data on the corresponding carriers and said copying means including means for making enlargements of selected portions of film frames on the basis of information encoded on the respective carriers.

24. A combination as defined in claim 23, wherein said identification facilitating means includes a plurality of templates, one of said templates being provided with a system of coordinates.

25. A combination as defined in claim 23, wherein said imaging means includes a lens system of variable focal length and said means for making enlargements includes means for moving said lens system with respect to film frames and said web.

26. A combination as defined in claim 25, wherein said means for making enlargements further comprises a first slide, a second slide mounted on said first slide and arranged to support a film strip, and means for moving said slides with and relative to each other to thereby place a selected portion of a frame forming part of the strip on said second slide into register with said lens system.

* * * * *